US008565958B1

(12) United States Patent
Montemerlo et al.

(10) Patent No.: US 8,565,958 B1
(45) Date of Patent: Oct. 22, 2013

(54) REMOVING EXTRANEOUS OBJECTS FROM MAPS (75) Inventors: Michael Steven Montemerlo, Mountain View, CA (US); Donald Jason Burnette, Mountain View, CA (US); Andrew Chatham, New York, NY (US); Daniel Trawick Egnor, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 81 days.

(21) Appl. No.: 13/151,461

(22) Filed: Jun. 2, 2011

(51) Int. Cl.
*G01C 21/32* (2006.01)
*G09B 29/00* (2006.01)
*G05D 1/02* (2006.01)

(52) U.S. Cl.
USPC .............................................. 701/25; 701/28

(58) Field of Classification Search
USPC .............................................. 701/25, 28, 23
See application file for complete search history.

(56) References Cited

U.S. PATENT DOCUMENTS

| 5,677,836 | A  | * | 10/1997 | Bauer .......................... 701/23 |
| 6,526,352 | B1 | * | 2/2003  | Johnson et al. ................ 701/470 |
| 6,728,608 | B2 | * | 4/2004  | Ollis et al. ...................... 701/28 |
| 7,013,235 | B2 | * | 3/2006  | Hyyppa et al. ................ 702/155 |
| 7,705,768 | B2 | * | 4/2010  | Nonaka et al. ............... 342/25 R |
| 7,720,647 | B2 | * | 5/2010  | Chang et al. .................. 702/190 |
| 7,995,055 | B1 | * | 8/2011  | Ma et al. ....................... 345/420 |
| 8,050,863 | B2 | * | 11/2011 | Trepagnier et al. ........... 701/514 |
| 8,086,071 | B2 | * | 12/2011 | Chen et al. .................... 382/284 |
| 8,260,539 | B2 | * | 9/2012  | Zeng ............................ 701/301 |
| 2003/0023614 | A1 | * | 1/2003  | Newstrom et al. ......... 707/104.1 |
| 2007/0065002 | A1 | * | 3/2007  | Marzell et al. ................ 382/154 |
| 2009/0088916 | A1 | * | 4/2009  | Elgersma et al. ............... 701/23 |
| 2009/0202109 | A1 | * | 8/2009  | Clar et al. ..................... 382/104 |
| 2010/0020074 | A1 |   | 1/2010  | Taborowski et al. |

(Continued)

FOREIGN PATENT DOCUMENTS

| JP | 2008065087 A | * | 3/2008 |
| WO | WO 2010024212 A1 | * | 3/2010 |
| WO | WO 2011066602 A1 | * | 6/2011 |

OTHER PUBLICATIONS

Shi, Y. et al., "An efficient method for making high-accuracy road true-orthoimages by fusing vehicle-based setero image and laser range data", 30$^{th}$ Asian Conference on Remote Sensing, Dec. 2009, ACRS 2009, Paper TS 17.5, pp. 383-389.*

(Continued)

*Primary Examiner* — James Trammell
*Assistant Examiner* — David Testardi
(74) *Attorney, Agent, or Firm* — Lerner, David, Littenberg, Krumholz & Mentlik, LLP (57) ABSTRACT

Aspects of the present disclosure relate generally to safe and effective use of autonomous vehicles. More specifically, laser data including locations, intensities, and elevation data may be collected along a roadway in order to generate a 3D map of the roadway. In order to remove extraneous objects such as moving vehicles from the 3D map, a 2D grid of the roadway may be generated. The grid may include a plurality of cells, each representing an area of the roadway. The collected data may be sorted into the grid based on location and then evaluated to identify the lowest elevation of the cell. All data points above some threshold distance above this lowest elevation may be removed. The resulting data points may be used to generate a 3D map of the roadway which excludes the extraneous objects.

21 Claims, 9 Drawing Sheets

(56) References Cited

U.S. PATENT DOCUMENTS

| | | | |
|---|---|---|---|
| 2010/0030473 A1* | 2/2010 | Au et al. | 701/301 |
| 2010/0034426 A1* | 2/2010 | Takiguchi et al. | 382/106 |
| 2010/0114416 A1* | 5/2010 | Au et al. | 701/23 |
| 2010/0296705 A1* | 11/2010 | Miksa et al. | 382/106 |
| 2011/0164037 A1* | 7/2011 | Yoshida et al. | 345/419 |
| 2011/0254833 A1* | 10/2011 | McDaniel et al. | 345/419 |
| 2011/0310091 A2* | 12/2011 | YOSHIDA et al. | 345/419 |

OTHER PUBLICATIONS

Lux, P.W. et al., "Range imaging for autonomous navigation of robotic land vehicles", Signal Processing, vol. 22 Issue 3, Mar. 1991, pp. 299-311.*

Bartha, Manfred B. et al., "Robot-motion in unstructured environment", 6th European ISTVS Conference, Vienna, Austria, Sep. 28-30, 1994, Proceedings vol. II, pp. 570ff.*

Gogle translation of WO 2010/024212.*

Microsoft translation of WO 2010/024212.*

Levinson, Jesse et al., "Map-based precision vehicle localization in urban environments", Proceedings of the Robotics: Science and Systems Conference, Jul. 27-30, 2007, Atlanta, GA, 8 pages.*

Witzgall, Christoph et al., "Terrain characterization from ground-based LADAR", Proceedings of the PerMIS '03 Workshop, National Institute of Standards and Technology, Sep. 16-18, 2003, Gaithersburg, MD, 8 pages.*

Rao, Rajendran et al., "Ground surface extraction from side scan vehicluar Lidar", MAPPS/ASPRS 2006 Fall Conference, Nov. 6-10, 2006, San Antonio, Texas, 8 pages.*

Yu, Si-Jie et al., "3D reconstruction of road surfaces using an integrated multi-sensory approach", Optics and Lasers in Engineering, vol. 45 Issue 7, Jul. 2007, pp. 808-818.*

Google translation of WO 2010/024212 (original WO document published Mar. 4, 2010).*

Microsoft translation of WO 2010/024212 (original WO document published Mar. 4, 2010).*

Anttoni Jaakkola, Juha Hyyppa, Hannu Hyyppa, and Antero Kukko, Retrieval Algorithms for Road Surface Modelling Using Laser-Based Mobile Mapping, Sep. 2008, 12 pages.

Dinesh Manandhar, Ryosuke Shibasaki, Auto-Extraction of Urban Features From Vehicle-Borne Laser Data, 2002, 6 pages.

Dinesh Manandhar, Ryosuke Shibasaki, Vehicle-borne Laser Mapping System (VLMS)—A New Observation System for 3-D Mapping of Urban Areas, Nov. 2001, 5 pages.

* cited by examiner

REMOVING EXTRANEOUS OBJECTS FROM MAPS

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are equipped with various types of sensors in order to detect objects in the surroundings. For example, autonomous vehicles may include lasers, sonar, radar, cameras, and other devices which scan and record data from the vehicle's surroundings. These devices in combination (and in some cases alone) may be used to build three dimensional or "3D" models of the objects detected in the vehicle's surrounding. However, other moving objects, such as cars, trucks, busses, may distort the information in the model.

BRIEF SUMMARY

One aspect of the disclosure provides a method for generating a 3D map of a roadway. The method includes receiving sensor data collected by a laser. The sensor data includes a plurality of data points where each data point represents a location and elevation of a particular location along the roadway. The method also includes generating, by a processor, a two dimensional or "2D" grid of the roadway. The 2D grid includes a plurality of cells, each cell representing an area of the roadway. The method also includes generating a first set of data points for each cell of the plurality of cells based on the locations of the data points; for each particular cell of the plurality of cells, identifying a data point of the first set associated with a lowest relative elevation; generating a second set of data points for each cell of the plurality of cells based on the lowest relative elevation; and generating the 3D map of the roadway based on the second set.

In one example, each cell of the plurality of cells has the same dimensions. In another example, at least two cells of the plurality of cells include different dimensions. In yet another example, the method also includes transferring the 3D map to an autonomous vehicle in order to navigate the vehicle along the roadway. In still another example, generating the second set includes removing any data points exceeding a threshold distance above the lowest elevation from the first set for the particular cell. In another example, the threshold distance is a fixed value for each cell of the plurality of cells. In yet another example, the threshold distance is based on the elevations of the data points of the first set. In still another example, generating the second set is further based on a threshold distance above the lowest relative elevation for each particular cell of the plurality of cells. In another example, the sensor data includes data collected from moving objects along the roadway, and the generated 3D map of the roadway does not include the data collected from the moving objects.

Another aspect of the disclosure provides a device for generating a 3D map of a roadway. The device includes memory for storing received sensor data collected by a laser. The sensor data includes a plurality of data points, where each data point representing a location and elevation of a particular location along the roadway. The device also includes a processor coupled to the memory. The processor is operable to generate a 2D grid of the roadway, the 2D grid including a plurality of cells, each cell representing an area of the roadway; generate a first set of data points for each cell of the plurality of cells based on the locations of the data points; for each particular cell of the plurality of cells, identify a data point of the first set associated with a lowest relative elevation; generate a second set of data points for each cell of the plurality of cells based on the lowest relative elevation; and generate the 3D map of the roadway based on the second set.

In one example, each cell of the plurality of cells has the same dimensions. In another example, at least two cells of the plurality of cells include different dimensions. In yet another example, the processor is further operable to transfer the 3D map to an autonomous vehicle in order to navigate the vehicle along the roadway. In still another example, the processor generates the second set by removing any data points exceeding a threshold distance above the lowest elevation from the first set for the particular cell. In another example, the threshold distance is a fixed value for each cell of the plurality of cells. In yet another example, the threshold distance is based on the elevations of the data points of the first set. In still another example, the processor is further operable to generate the second set based on a threshold distance above the lowest relative elevation for each particular cell of the plurality of cells. In another example, the sensor data includes data collected from moving objects along the roadway, and the generated 3D map of the roadway does not include the data collected from the moving objects.

Yet another aspect of the disclosure provides a tangible computer-readable storage medium on which computer readable instructions of a program are stored, the instructions, when executed by a processor, cause the processor to perform a method of generating a 3D map of a roadway. The method includes receiving sensor data collected by a laser. The sensor data includes a plurality of data points where each data point represents a location and elevation of a particular location along the roadway. The method also includes generating, by a processor, a 2D grid of the roadway. The 2D grid includes a plurality of cells, each cell representing an area of the roadway. The method also includes generating a first set of data points for each cell of the plurality of cells based on the locations of the data points; for each particular cell of the plurality of cells, identifying a data point of the first set associated with a lowest relative elevation; generating a second set of data points for each cell of the plurality of cells based on the lowest relative elevation; and generating the 3D map of the roadway based on the second set.

In one example, each cell of the plurality of cells has the same dimensions. In another example, at least two cells of the plurality of cells include different dimensions. In yet another example, the method also includes transferring the 3D map to an autonomous vehicle in order to navigate the vehicle along the roadway. In still another example, generating the second set includes removing any data points exceeding a threshold distance above the lowest elevation from the first set for the particular cell. In another example, the threshold distance is a fixed value for each cell of the plurality of cells. In yet another example, the threshold distance is based on the elevations of the data points of the first set. In still another example, generating the second set is further based on a threshold distance above the lowest relative elevation for each particular cell of the plurality of cells. In another example, the sensor data includes data collected from moving objects along the roadway, and the generated 3D map of the roadway does not include the data collected from the moving objects.

Still another aspect of the disclosure provides a vehicle. The vehicle includes a braking system configured to decelerate the vehicle, an acceleration system configured to accelerate the vehicle, and a steering system configured to change the direction of motion of the vehicle. A processor is coupled to the breaking, acceleration, and steering systems. Memory is also coupled to the processor. The memory stores a 3D map of a roadway. The 3D map is generated by receiving sensor data, the sensor data including a plurality of data points, each data point representing a location and elevation of a particular location along the roadway; generating a 2D grid of the roadway, the 2D grid including a plurality of cells, each cell representing an area of the roadway; generating a first set of data points for each cell of the plurality of cells based on the locations of the data points; for each particular cell of the plurality of cells, identifying a data point of the first set associated with a lowest relative elevation; generating a second set of data points for each cell of the plurality of cells based on the lowest relative elevation; and generating the 3D map of the roadway based on the second set. The processor is operable to access the 3D map of the roadway from the memory and use the 3D map of the roadway to navigate the vehicle along a roadway by controlling one or more of the braking, acceleration, and steering systems.

DETAILED DESCRIPTION

In one aspect of the disclosure, a computer may receive sensor data collected by a laser. The sensor data may include data points describing the location and elevation of particular locations along a roadway. A 2D grid of the roadway may be generated. The 2D grid may include a plurality of cells each representing an area of the roadway. The data points may be sorted into the cells based on the location of the data points. For each cell, the data point associated with the lowest elevation may be identified. For each cell, any data points with an elevation above some threshold above the lowest elevation of the particular cell may be removed. A 3D map of the roadway may be generated based on the remaining data points. The map may be transmitted or otherwise sent to an autonomous vehicle to be used to navigate the vehicle along the roadway.

Figure 1:
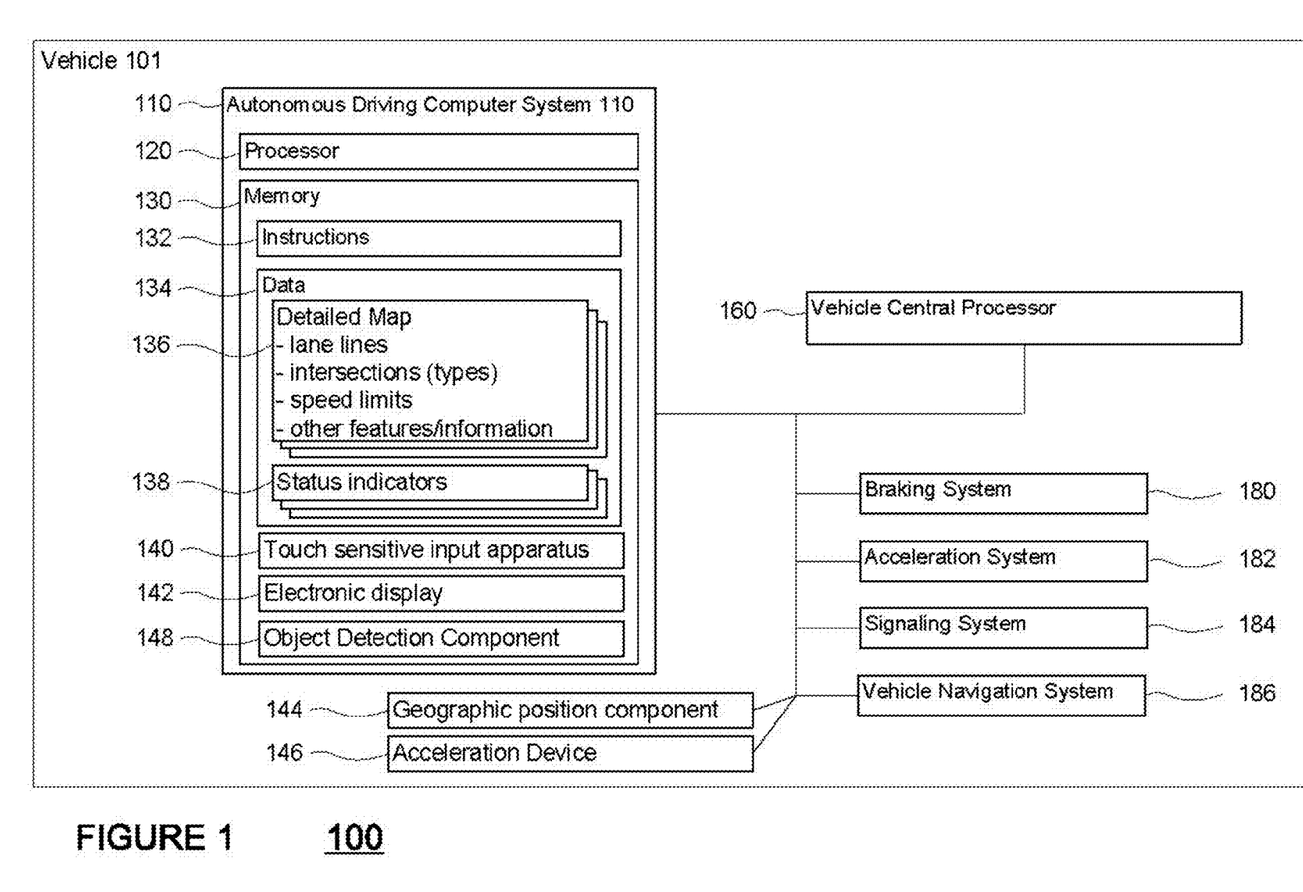
FIG. 1 is a functional diagram of a system in accordance with an exemplary embodiment.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components such as steering components and deceleration components may each have their own processor that only performs calculations related to the component's specific function.

In various of the aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g. a video camera) for gathering the explicit (e.g. a gesture) or implicit (e.g. "the person is asleep") information about the states and desires of a person.

Figure 2:
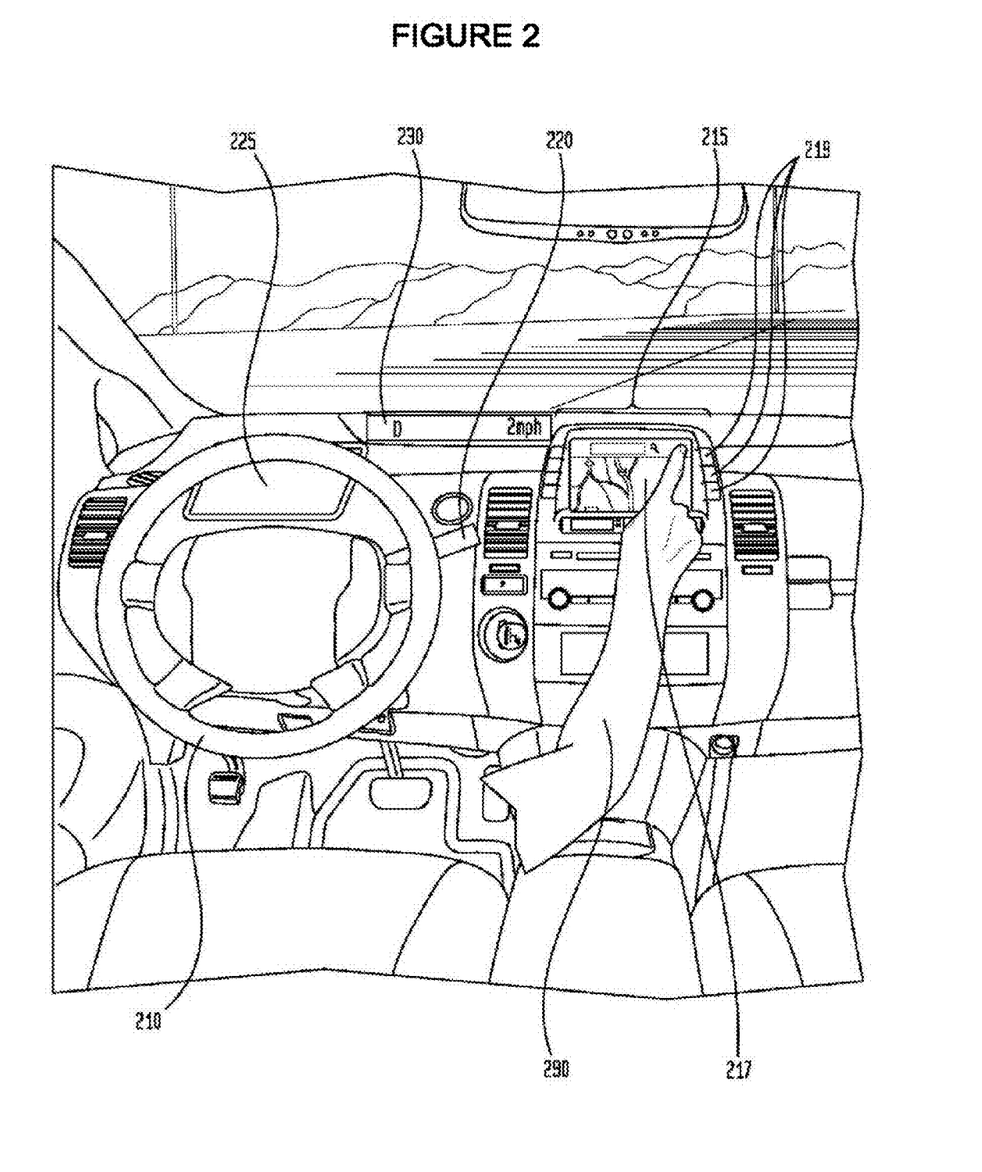
FIG. 2 is an interior of an autonomous vehicle in accordance with an exemplary embodiment.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more additional displays. For example, the vehicle may include a display 225 for displaying information regarding the status of the autonomous vehicle or its computer. In another example, the vehicle may include a status indicating apparatus 138 (see FIG. 1), such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle. For example, returning to FIG. 1, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Figure 3:
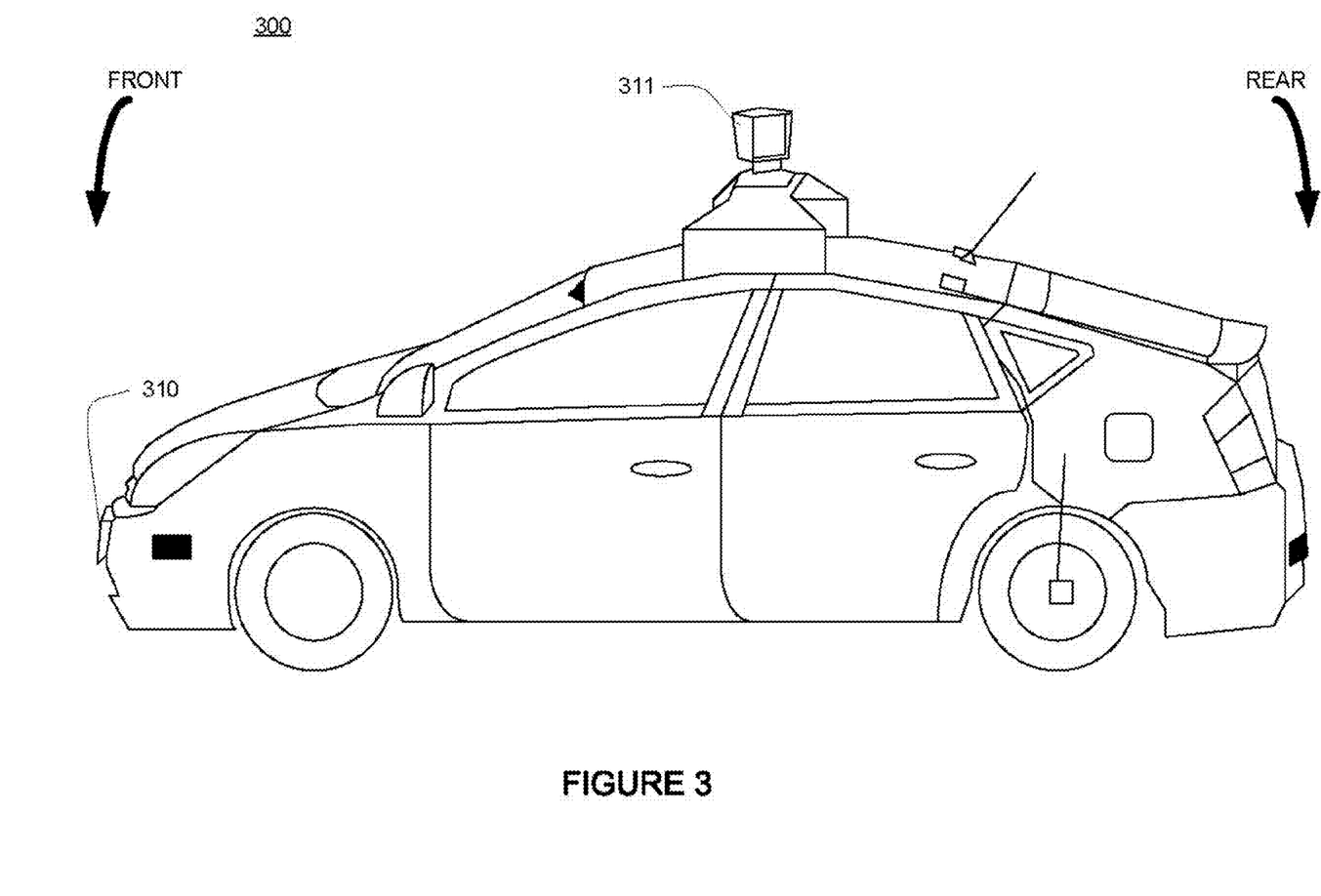
FIG. 3 is an exterior of an autonomous vehicle in accordance with an exemplary embodiment.

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger vehicle, the car may include a laser mounted on the roof or other convenient location. As shown in FIG. 3, small passenger vehicle 300 may include lasers 310 and 311, mounted on the front and top of the vehicle, respectively. The lasers may include commercially available lasers such as the Velodyne HDL-64 or other models. In one example, laser 310 may have a range of 150 meters, a thirty degree vertical field of view, and a thirty degree horizontal field of view. Laser 311 may have a range of 50-80 meters, a thirty degree vertical field of view, and a 360 degree horizontal field of view. The laser may provide the vehicle with range and intensity information which the computer may use to identify the location and distance of various objects in the vehicles surroundings. In one aspect, the laser may measure the distance between the vehicle and the object surfaces facing the vehicle by spinning on its axis and changing its pitch.

The aforementioned sensors may allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, break pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

Again, although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 4A:
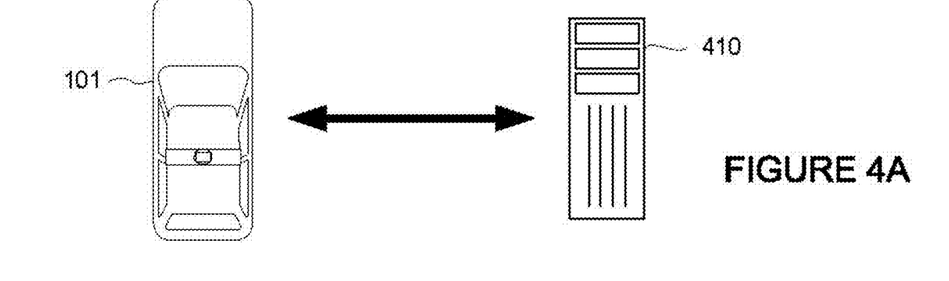
FIG. 4A is a pictorial diagram of a system in accordance with an exemplary embodiment.
Figure 4B:
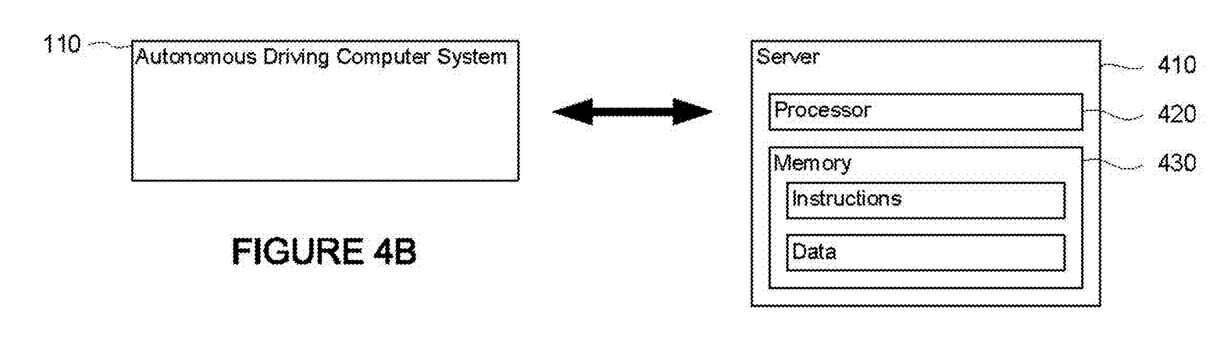
FIG. 4B is a functional diagram of a system in accordance with an exemplary embodiment.

The sensor data and stored by computer 110 may be processed as described herein by computer 110 or may be transferred to other computers for further processing. For example, as shown in FIGS. 4A and 4B, data from computer 110 may be transmitted via a network to computer 410 for further processing. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces. In another example, data may be transferred by storing it on memory which may be accessed by or connected to computer 410.

In one example, computer 410 may comprise a single server having a plurality of computers, e.g., a load balanced server farm, that exchange information with different nodes of a network for the purpose of receiving, processing and transmitting the data from computer 110. The server may be configured similarly to the computer 110, with a processor 420, memory 430, instructions, and data.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to generate the detailed map information described above, data regarding the location and elevation of the roadway and landscape may be collected by the vehicle's sensors. For example, a vehicle including one or more lasers may be driven along a roadway. As the laser is moved along, it may collect data points including range and intensity information for the same location (point or area) from several directions and/or at different times. For example, each data point may include a location component and an elevation component: (x,y,z).

Figure 5:
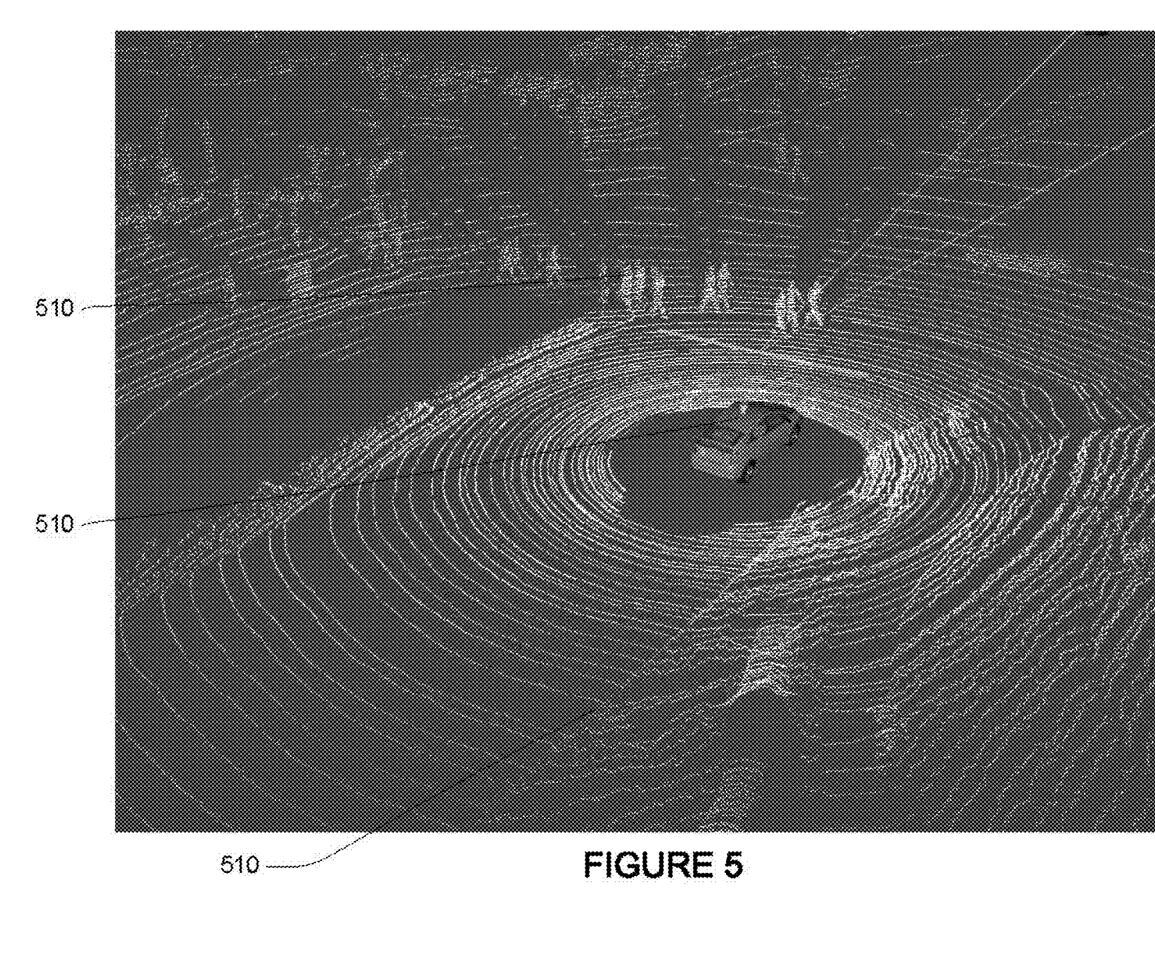
FIG. 5 is a diagram of laser data in accordance with an exemplary embodiment.

In one example, FIG. 5 depicts vehicle 300 approaching an intersection. The image was generated based on laser data collected by the vehicle's lasers for a single period of time. The white lines represent how the laser "sees" its surroundings. For example, the laser data may include the outline, shape and distance from vehicle 300 of various objects such as people 510 and curb 520.

Figure 6:
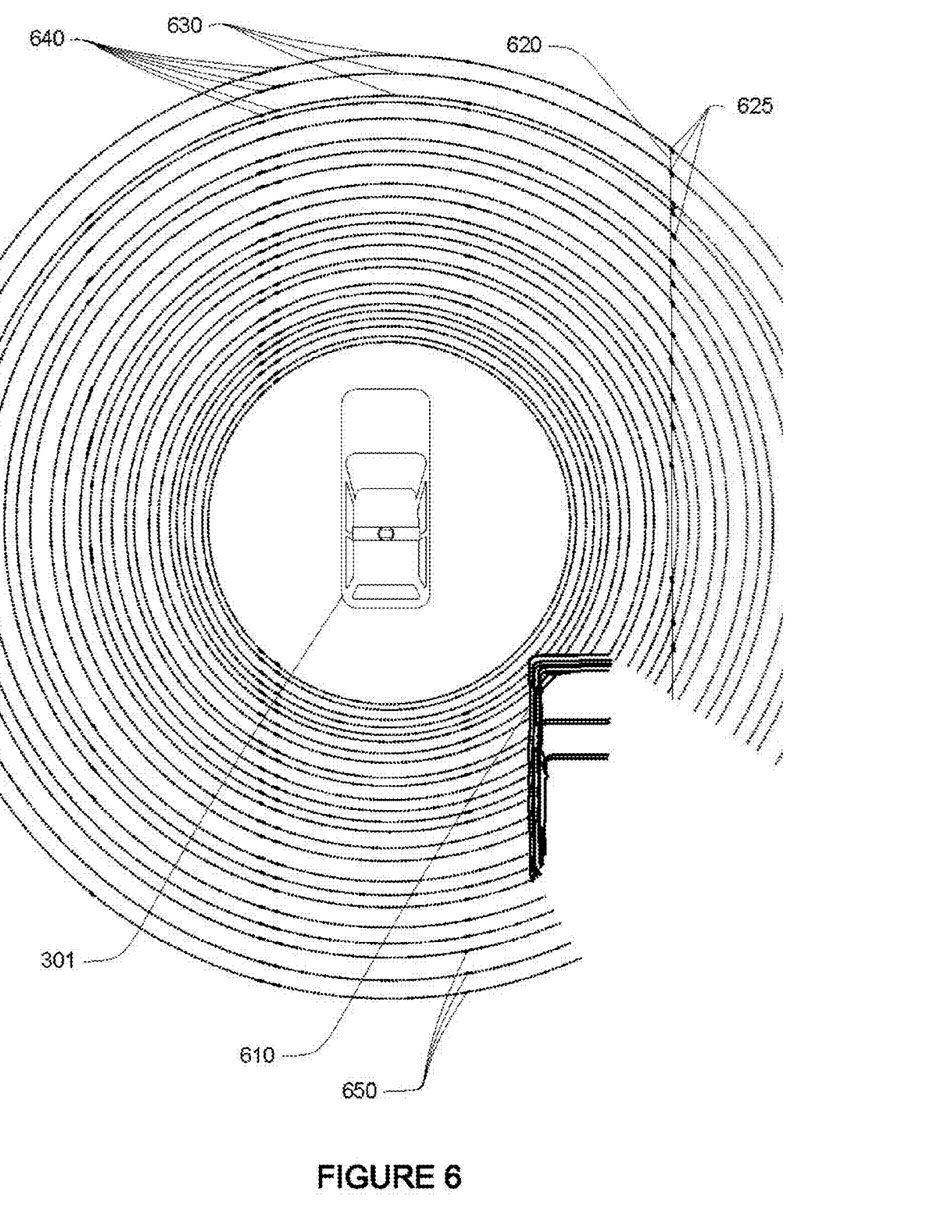
FIG. 6 is a diagram of laser data in accordance with an exemplary embodiment.

In another example, depicted in FIG. 6, vehicle 300 is driving along a section of roadway collecting data about its surroundings using the laser. As another vehicle 610 approaches from behind, the vehicle appears as a "disturbance" in the shape of the laser lines 630. Again, the collected data may also include information about the vehicle's surroundings such as the location of a curb. Reference line 620 connects the distance and location readings 625 of the edge of the curb and is not part of the laser data. The laser data may also include indications of the distance and location of lane lines. For example, FIG. 6 includes distance and location readings 640 representing solid double yellow lane lines as well as distance and location readings 650 representing white lane lines.

As the vehicle continues to move along the roadway, the laser may take multiple measurements of a single geographic area. For example, a small patch of the roadway may be measured several times as the vehicle approaches the patch, passes the patch, and moves away from the patch. Thus, from a single pass, the laser information may include many different (intensity and range) data points for the same location.

Figure 7:
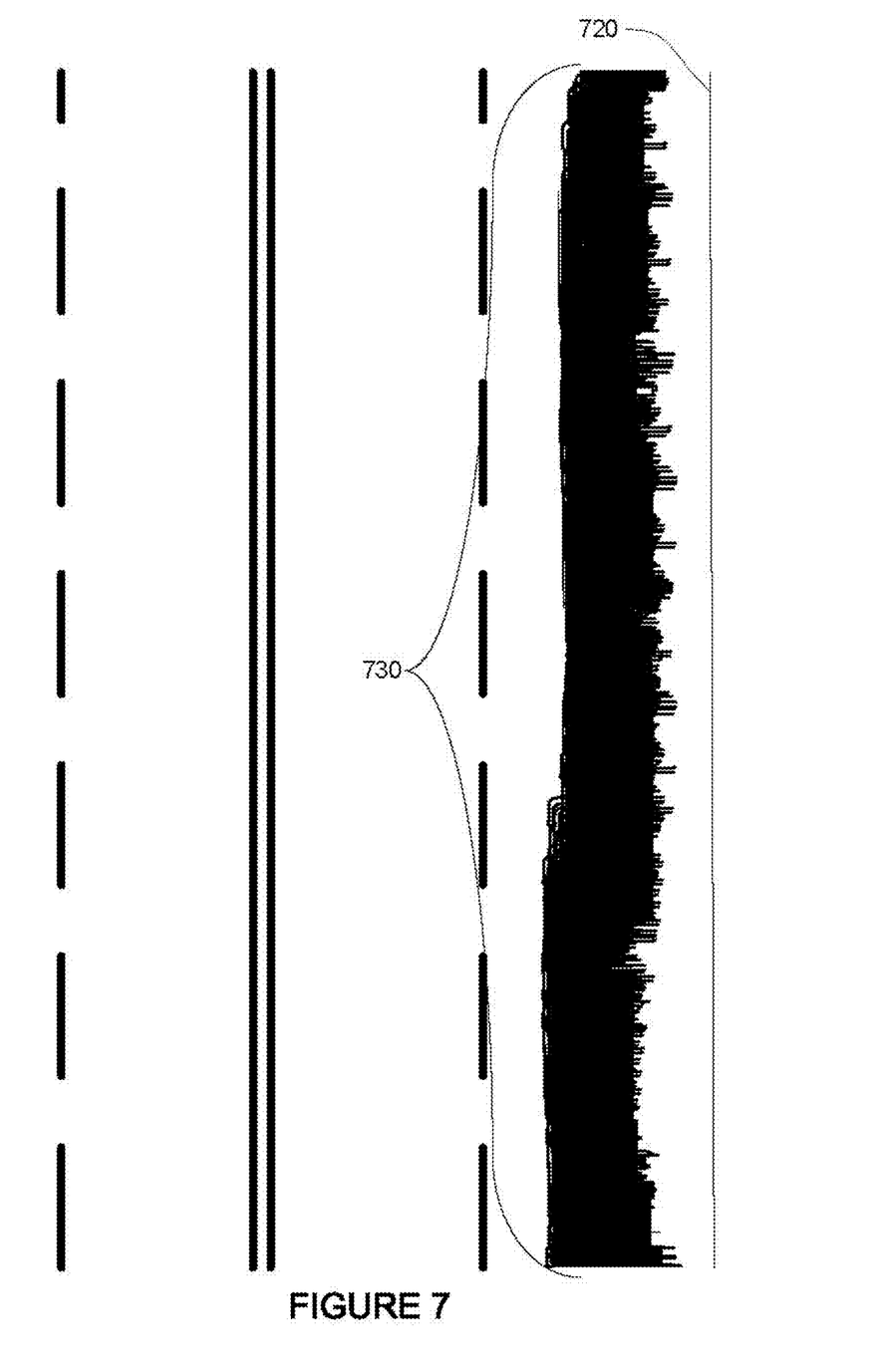
FIG. 7 is a map in accordance with an exemplary embodiment.

This data may be transferred to another computer for further processing as described above or processed at the vehicle. The data points may be processed to generate a 3D map of the roadway from the intensity and range information. For example, the map may include objects such as the roadway, lane lines, curbs, sidewalks, intersections, traffic signals, etc. as described above. This map may also include unwanted objects based on data points collected from other moving objects such as passing cars or trucks. As shown in FIG. 7, the data point collected along the roadway may be used to reconstruct the roadway in three dimensions. For example, curb 720 may be generated, based on the distance and locations readings 625 of the edge of the curb, is visible. However, as vehicle 300 drove along the roadway the data points collected from the various locations of vehicle 610 may appear as a bright streak 730 in an intensity map.

In order to remove unwanted objects from the 3D map, a 2D map grid may be generated. For example, all of the data points for a given area may be projected into cells of the grid. The cells may be of various sizes, for example, 12 cm by 12 cm or larger or smaller. In another example, the cells may vary slightly within the same grid. For example, the cell sizes may vary by the geographic position of the vehicle and depending upon the map projection of the map or map product used by the vehicle. The map projection may be lined up pixel for pixel with the vehicle's projection into the cells of the 2D grid. In some examples, the size of the grid pixels may vary with latitude (but not longitude). Thus, for example in the San Francisco Bay area, the size of the cells may be approximately 11-12 cm.

Figure 8A:
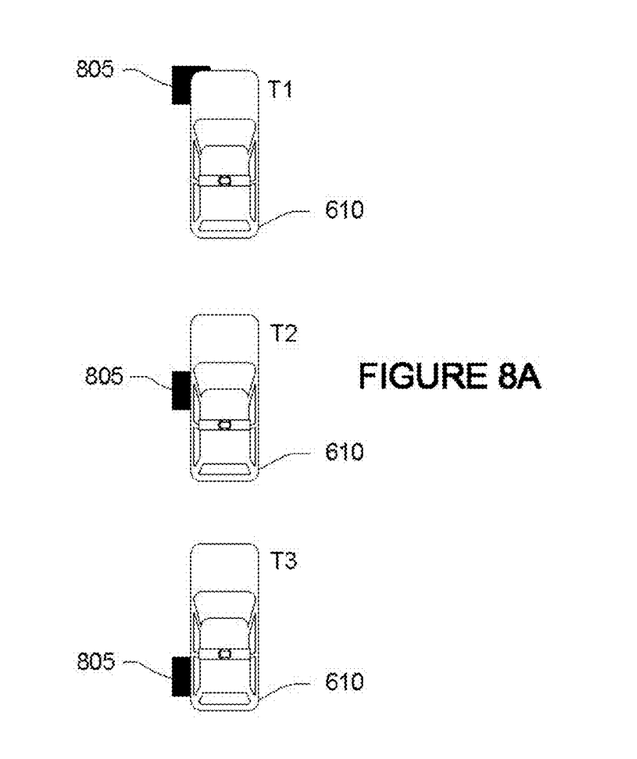
FIGS. 8A and 8B are vehicles in accordance with an exemplary embodiment.
Figure 8B:
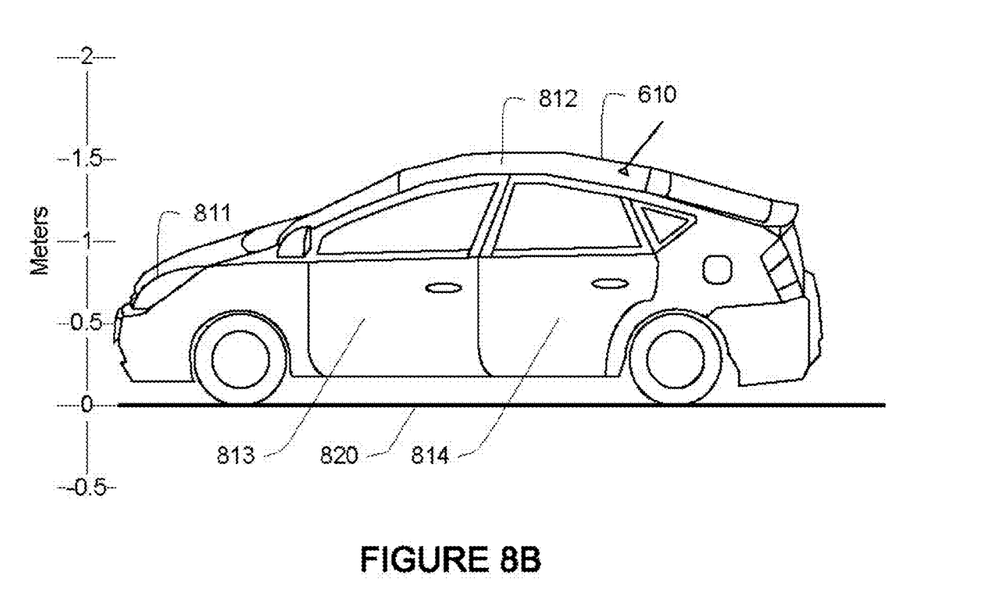

Each cell may contain data points generated from different portions of the unwanted object as well as the roadway. For example, as the driver's side of vehicle 610 passes over the area of roadway corresponding to a particular cell, measurements may be collected for a range of different heights. For example, different sections of the vehicle may pass over cell 805 at different times (T1, T2, and T3) as shown in FIG. 8A. Thus, referring to FIG. B, the same cell may include a data point from the top of a headlight 811 at about 0.6 meters, the top of the roof 812 at about 1.45 meters, the driver and passenger doors 813-814 at between about 0.15 and 0.8 meters, etc. (all relative to the roadway 820). The same cell may also have several measurements of the elevation of the area of roadway. Accordingly a cell of 12 cm by 12 cm may have from 0 to several hundred or more data points depending upon the number of passes through the area, speed of the laser (and vehicle), etc.

The data points for each cell may be evaluated to identify the data point associated with the lowest elevation. This data point may be assumed to be the closest to the actual roadway (the ground). Once this lowest elevation has been identified, all of the data points within the cell with an elevation greater than some threshold distance may be assumed to be associated with an unwanted object.

The threshold distance may be based on the accuracy of the sensors. If the sensors are highly accurate, the threshold distance may be very small, such as a few centimeters, or nothing. If the sensors are less accurate, the threshold may be greater. This threshold may also be a fixed number for each cell, such as 15 cm, or may be determined for each individual cell, for example, by calculating a mean difference in elevation among all or some portion of the data points in a cell.

All the data points identified as being associated with an unwanted object may be removed. For example, each cell may include a set of data points. Any data points identified as being associated with an unwanted object may be removed from the set, or a new set may be generated which does not include the data points associated with an unwanted object. The result may be a plurality of data points which reflects the elevation of the roadway beneath the unwanted object. In order to remove extraneous objects, a particular cell may include at least 2 data points.

This result may then be used to generate another 3D map of the roadway without the unwanted moving objects. For example, the new map may no longer include bright streak 730 of FIG. 7. If the processing is performed remotely, the map may be transmitted or transferred to the vehicle's computer and used as a tool to maneuver the autonomous vehicle as described above.

Figure 9:
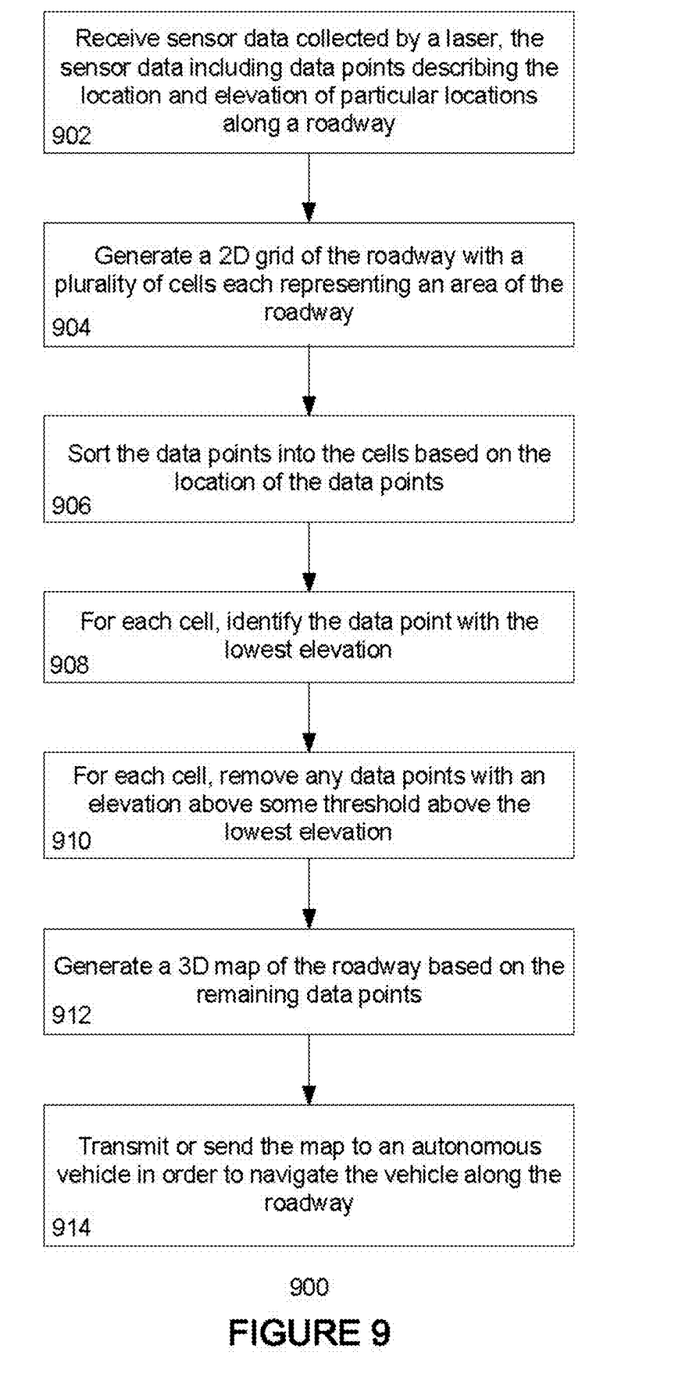
FIG. 9 is a flow diagram in accordance with an exemplary embodiment.

Flow diagram 900 is an exemplary embodiment of some of the aspects described above. For example, as shown in block 902, a computer receives sensor data collected by a laser. The sensor data includes data points describing the location and elevation of particular locations along a roadway. At block 904, a 2D grid of the roadway is generated. The 2D grid includes a plurality of cells each representing an area of the roadway. At block 906, the data points are sorted into the cells based on the location of the data points. At block 908, for each cell, the data point associated with the lowest elevation is identified. At block 910, for each cell, any data points with an elevation above some threshold above the lowest elevation of the particular cell, are removed. At block 912, a 3D map of the roadway is generated based on the remaining data points. At block 914, the map may be transmitted or otherwise sent to an autonomous vehicle to be used to navigate the vehicle along the roadway.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for generating a 3D map of a roadway, the method comprising:
   receiving sensor data collected by a sensor of a vehicle, the sensor data including a plurality of data points, each data point representing a location and elevation of a particular location along the roadway;
   generating, by a processor, a 2D grid of the roadway, the 2D grid including a plurality of cells, each cell representing an area of the roadway and having particular dimensions, wherein the processor generates the particular dimensions for each cell of the plurality of cells based on an absolute geographic location of the vehicle defined at least by the geographic latitude of the vehicle when the sensor data was collected;
   generating a first set of data points for each cell of the plurality of cells based on the locations of the data points;
   for each particular cell of the plurality of cells, identifying a data point of the first set associated with a lowest relative elevation;
   generating a second set of data points for each cell of the plurality of cells based on the lowest relative elevation; and
   generating the 3D map of the roadway based on the second set.

2. The method of claim 1, further comprising transferring the 3D map to an autonomous vehicle in order to navigate the vehicle along the roadway.

3. The method of claim 1, wherein generating the second set includes removing any data points exceeding a threshold distance above the lowest elevation from the first set for the particular cell.

4. The method of claim 3, wherein the threshold distance is a fixed value for each cell of the plurality of cells.

5. The method of claim 3, wherein the threshold distance is based on the elevations of the data points of the first set.

6. The method of claim 3, further comprising determining the threshold distance based on an accuracy of the sensor.

7. The method of claim 1, wherein generating the second set is further based on a threshold distance above the lowest relative elevation for each particular cell of the plurality of cells.

8. The method of claim 1, wherein the sensor data includes data collected from moving objects along the roadway, and the generated 3D map of the roadway does not include the data collected from the moving objects.

9. The method of claim 1, wherein the particular dimensions for the area of each cell of the plurality of cells are generated by the processor further based on a map projection over the 2D grid.

10. The method of claim 1, further comprising determining, for each particular cell the plurality of cells, a threshold distance for the particular cell, and wherein generating the second set includes removing any data points exceeding the threshold distance for the particular cell above the lowest elevation from the first set for the particular cell.

11. The method of claim 10, wherein the threshold distances are further determined based on a mean elevation difference between the lowest relative elevation and the elevations of the first set of data points for that given cell.

12. A device for generating a 3D map of a roadway, the device comprising:
    memory for storing received sensor data collected by a sensor of a vehicle, the sensor data including a plurality of data points, each data point representing a location and elevation of a particular location along the roadway;
    a processor coupled to the memory, the processor being operable to:
    generate a 2D grid of the roadway, the 2D grid including a plurality of cells, each cell representing an area of the roadway and having particular dimensions, wherein generating the particular dimensions for the area of each cell of the plurality of cells is based on an absolute geographic location of the vehicle defined at least by the geographic latitude of the vehicle when the sensor data was collected;
    generate a first set of data points for each cell of the plurality of cells based on the locations of the data points;
    for each particular cell of the plurality of cells, identify a data point of the first set associated with a lowest relative elevation;
    generate a second set of data points for each cell of the plurality of cells based on the lowest relative elevation; and
    generate the 3D map of the roadway based on the second set.

13. The device of claim 12, wherein the processor is further operable to transfer the 3D map to an autonomous vehicle in order to navigate the vehicle along the roadway.

14. The device of claim 12, wherein the processor generates the second set by removing any data points exceeding a threshold distance above the lowest elevation from the first set for the particular cell.

15. The device of claim 14, wherein the threshold distance is a fixed value for each cell of the plurality of cells.

16. The device of claim 14, wherein the threshold distance is based on the elevations of the data points of the first set.

17. The device of claim 12, wherein the processor is further operable to generate the second set based on a threshold distance above the lowest relative elevation for each particular cell of the plurality of cells.

18. The device of claim 12, wherein the sensor data includes data collected from moving objects along the roadway, and the generated 3D map of the roadway does not include the data collected from the moving objects.

19. A non-transitory computer-readable storage medium on which computer readable instructions of a program are stored, the instructions, when executed by a processor, cause the processor to perform a method of generating a 3D map of a roadway, the method comprising:
    receiving sensor data collected by a sensor of a vehicle, the sensor data including a plurality of data points, each data point representing a location and elevation of a particular location along the roadway;
    generating, by a processor, a 2D grid of the roadway, the 2D grid including a plurality of cells, each cell representing an area of the roadway and having particular dimensions, wherein generating the particular dimensions for the area of each cell of the plurality of cells is based on an absolute geographic location of the vehicle defined at least by the geographic latitude of the vehicle when the sensor data was collected;
    generating a first set of data points for each cell of the plurality of cells based on the locations of the data points;
    for each particular cell of the plurality of cells, identifying a data point of the first set associated with a lowest relative elevation;
    generating a second set of data points for each cell of the plurality of cells based on the lowest relative elevation; and
    generating the 3D map of the roadway based on the second set.

20. The non-transitory computer-readable storage medium of claim 19, wherein the method further comprises generating the second set by removing any data points exceeding a threshold distance above the lowest elevation from the first set for the particular cell.

21. A vehicle comprising:
    a braking system configured to decelerate the vehicle;
    an acceleration system configured to accelerate the vehicle;
    a steering system configured to change the direction of motion of the vehicle;
    a processor coupled to the braking, acceleration, and steering systems; and
    memory coupled to the processor, the memory storing a 3D map of a roadway, the 3D map being generated by:
    receiving sensor data, the sensor data including a plurality of data points, each data point representing a location and elevation of a particular location along the roadway;
    generating a 2D grid of the roadway, the 2D grid including a plurality of cells, each cell representing an area of the roadway and having particular dimensions, wherein generating the particular dimensions for the area of each cell of the plurality of cells is based on an absolute geographic location of the vehicle defined at least by the geographic latitude of the vehicle when the sensor data was collected;
    generating a first set of data points for each cell of the plurality of cells based on the locations of the data points;
    for each particular cell of the plurality of cells, identifying a data point of the first set associated with a lowest relative elevation;
    generating a second set of data points for each cell of the plurality of cells based on the lowest relative elevation; and
    generating the 3D map of the roadway based on the second set; and
    wherein the processor is operable to access the 3D map of the roadway from the memory and use the 3D map of the roadway to navigate the vehicle along a roadway by controlling one or more of the braking, acceleration, and steering systems.

* * * * *